US012325951B2

(12) United States Patent
Cleary et al.

(10) Patent No.: US 12,325,951 B2
(45) Date of Patent: Jun. 10, 2025

(54) LAUNDRY HAMPER

(71) Applicants: Zachary Cleary, Fairway, KS (US); Hannah Cleary, Fairway, KS (US)

(72) Inventors: Zachary Cleary, Fairway, KS (US); Hannah Cleary, Fairway, KS (US)

( * ) Notice: Subject to any disclaimer, the term of this patent is extended or adjusted under 35 U.S.C. 154(b) by 58 days.

(21) Appl. No.: 18/504,798

(22) Filed: Nov. 8, 2023

(65) Prior Publication Data
US 2024/0150956 A1 May 9, 2024

Related U.S. Application Data

(60) Provisional application No. 63/384,700, filed on Nov. 22, 2022, provisional application No. 63/475,441, filed on Nov. 8, 2022.

(51) Int. Cl.
*D06F 95/00* (2006.01)
*B01D 53/26* (2006.01)

(52) U.S. Cl.
CPC ......... *D06F 95/002* (2013.01); *B01D 53/261* (2013.01)

(58) Field of Classification Search
CPC ... D06F 95/002; D06F 95/004; B01D 53/261; B01D 2259/4541; B65F 1/004; B65F 1/0046; B65F 1/0073; B65F 1/06; B65F 1/067; B65F 1/0026; B65F 1/16; B65F 1/1646; B65F 2001/1653; B65B 67/12
See application file for complete search history.

(56) References Cited

U.S. PATENT DOCUMENTS

| | | | | |
|---|---|---|---|---|
| 2,625,973 A | * | 1/1953 | Weldon | D06F 95/004 312/211 |
| 2,895,782 A | * | 7/1959 | Fragale | D06F 95/002 211/184 |
| 3,977,450 A | * | 8/1976 | Schampier | A47G 29/06 383/7 |
| 3,995,924 A | * | 12/1976 | Jones | B65B 67/1227 312/211 |
| 4,834,262 A | * | 5/1989 | Reed | B65F 1/004 220/23.6 |
| 4,967,900 A | * | 11/1990 | Gossett | B65F 1/067 220/17.1 |
| 5,085,342 A | * | 2/1992 | Strawder | B65F 1/06 D34/5 |
| 5,118,173 A | * | 6/1992 | Proctor | D06F 95/002 220/23.88 |
| 5,119,958 A | * | 6/1992 | Gabert | B65F 1/067 220/909 |
| 5,165,564 A | * | 11/1992 | Prout | B65F 1/1468 220/254.1 |
| 5,174,468 A | * | 12/1992 | Holderman | B65F 1/0066 220/571 |
| 5,238,139 A | * | 8/1993 | Bisceglia | B65F 1/067 248/101 |

(Continued)

*Primary Examiner* — William L Miller
(74) *Attorney, Agent, or Firm* — Law Office of Julie Scott LLC

(57) ABSTRACT

The present invention provides an improved laundry hamper that dehumidifies damp or wet clothing and reduces undesirable odors emanating from them. The invention is particularly useful for the storage and deodorizing of athletic or workout clothing after use and prior to laundering. The invention also provides a better way of organizing dirty laundry as compared to a traditional laundry hamper in which clothes are piled together.

15 Claims, 4 Drawing Sheets

(56) References Cited

U.S. PATENT DOCUMENTS

| | | | | |
|---|---|---|---|---|
| D341,685 S | * | 11/1993 | Brooks | D32/36 |
| 5,328,028 A | * | 7/1994 | Hale | B65F 1/1607 |
| | | | | 206/370 |
| 5,380,081 A | * | 1/1995 | Vogt | B65F 1/067 |
| | | | | 312/212 |
| 5,833,336 A | * | 11/1998 | Dean | D06F 95/002 |
| | | | | 312/351 |
| 5,873,643 A | * | 2/1999 | Burgess, Jr. | B65F 1/067 |
| | | | | 312/351 |
| 6,378,721 B1 | * | 4/2002 | Williams | B65F 1/067 |
| | | | | 220/523 |
| 6,691,879 B1 | * | 2/2004 | Alvarez | B62B 3/02 |
| | | | | 211/85.24 |
| 7,204,407 B2 | * | 4/2007 | Laher | B65F 1/1607 |
| | | | | 220/909 |
| D604,472 S | * | 11/2009 | Blanks | D34/7 |
| 8,910,813 B1 | * | 12/2014 | Barre | D06F 95/002 |
| | | | | 220/528 |
| 9,957,089 B2 | * | 5/2018 | Rogers | B65D 43/06 |
| D979,166 S | * | 2/2023 | Song | D32/37 |
| D1,008,589 S | * | 12/2023 | Chen | D32/37 |
| D1,037,590 S | * | 7/2024 | Chen | D32/37 |
| 2006/0157358 A1 | * | 7/2006 | Heidel | D06F 95/002 |
| | | | | 206/278 |
| 2007/0095839 A1 | * | 5/2007 | Stone | B65F 1/068 |
| | | | | 220/495.06 |
| 2007/0253648 A1 | * | 11/2007 | Austin | B65F 1/1607 |
| | | | | 220/9.3 |
| 2008/0035640 A1 | * | 2/2008 | Weber | B65F 1/16 |
| | | | | 206/524.1 |
| 2008/0179330 A1 | * | 7/2008 | Brooks | B65F 1/0006 |
| | | | | 220/495.07 |
| 2010/0270441 A1 | * | 10/2010 | Dembowiak | B65F 1/0073 |
| | | | | 248/95 |
| 2013/0154320 A1 | * | 6/2013 | Byrd | A47D 15/00 |
| | | | | 297/219.12 |
| 2014/0008360 A1 | * | 1/2014 | Philip | D06F 95/002 |
| | | | | 220/9.4 |
| 2015/0076152 A1 | * | 3/2015 | Buck | B65F 1/02 |
| | | | | 220/495.08 |
| 2015/0336739 A1 | * | 11/2015 | Presnell | B65F 1/1607 |
| | | | | 220/23.83 |
| 2016/0052710 A1 | * | 2/2016 | Butler | B65F 1/141 |
| | | | | 220/560 |
| 2016/0101934 A1 | * | 4/2016 | Kulseng-Varmedal | B65F 1/06 |
| | | | | 220/495.11 |
| 2016/0137412 A1 | * | 5/2016 | Capetillo | B65F 1/085 |
| | | | | 220/529 |
| 2020/0298178 A1 | * | 9/2020 | Cuesta | B01D 53/28 |
| 2022/0056633 A1 | * | 2/2022 | Tuang | D06F 95/002 |
| 2022/0315326 A1 | * | 10/2022 | Logan | B65F 1/004 |
| 2023/0160137 A1 | * | 5/2023 | Forgacs | D06F 95/004 |
| | | | | 232/1 B |
| 2023/0322428 A1 | * | 10/2023 | Lawson | B65B 67/1216 |
| | | | | 248/95 |
| 2024/0199320 A1 | * | 6/2024 | Price | B65D 33/14 |

* cited by examiner

LAUNDRY HAMPER

REFERENCE TO RELATED PATENTS

This application claims the benefit of U.S. Patent Application 63/475,441 that was filed Nov. 8, 2022 and of U.S. Patent Application 63/384,700 that was filed Nov. 22, 2022.

FIELD OF THE INVENTION

The present invention relates to an improved laundry hamper that is used to store, deodorize, and dehumidify sweaty or soiled clothes.

BACKGROUND OF THE INVENTION

Residential laundry hampers have been in use for centuries and began being carried by major retailers in the 1850s. Traditionally the purpose of laundry hampers was to organize clothes worn during the day. The majority of laundry hampers on the market today have a single, large compartment where clothes from the day are piled on clothes from the previous day. Such hampers do not allow for compartmentalization, proper ventilation, dehumidification, or deodorizing of soiled clothes and do not address the malodorous problems that are often associated with them.

Clothing worn during exercise or odiferous activities are particularly prone to developing undesirable odors and are often damp or even wet after use. Popular approaches to try to reduce the dampness or odiferous of the clothing include hanging the clothing in a bathroom or on a door to dry. Unfortunately, hanging the clothing generally leads to a foul odor emanating from the clothes into the immediate areas and leaves the door non-functional while the items dry. Another common approach is to immediately launder the clothing. This latter solution leads to the use of excess water and electricity, especially in households with multiple children in organized sports.

SUMMARY OF THE INVENTION

The present invention provides an improved hamper and design that addresses the storage and organization of clothing after they have been worn during exercise or other activities that result in malodorous clothing. Advantageously, the invention dehumidifies the clothing and reduces undesirable odors emanating from the clothes when they are in the hamper, i.e. the invention deodorizes the clothing. In addition, the invention improves the storage of the used clothing prior to being laundered.

The invention provides a tri-component design that includes both a rigid basket and two flexible components. One flexible component (a stretchable insert) is placed into the basket and used clothing can be placed into this flexible component. The second flexible component (a stretchable cover) is placed over both the basket and the first flexible component so that the interior of the basket and the first component are enclosed by the second flexible component.

To remove moisture from the clothing that is placed inside the hamper, at least one receptacle containing a desiccant is placed inside the basket on the upper surface of the bottom of the basket. Those of skill in the art will recognize that multiple containers containing one or more desiccants may be placed on the bottom of the basket to remove moisture from the clothing. Further, the amount of desiccant in each container can be varied and achieve the same or a similar result. In preferred embodiments, the desiccant is calcium chloride. Those of skill in the art will recognize that other desiccants or combinations of desiccants may be used in the invention and achieve similar results.

In addition, the inventors found that some air exchanged improved the function of the invention. Specifically, a multitude of small openings (holes) are present in the stretchable insert and the rigid basket so that some air exchange can occur between the exterior, the interior of the basket, the stretchable insert, and the clothing inside the stretchable insert.

The inventors found that dividing the stretchable insert into multiple bags, each of which includes a multitude of ventilation openings, provided better performance. Skilled artisans will appreciate that the stretchable insert can be divided into any number of bags as long as each can hold an article of clothing. Preferred stretchable inserts are divided into at least two bags, more preferably they are divided into three or more bags. Most preferably stretchable inserts are divided into four bags.

Embodiments of the invention for an improved laundry hamper comprise a rigid basket having a front, a back, a left side, a right side, and a bottom, wherein the front, back, left side, and right side include a multitude of ventilation openings; a stretchable cover having a front, a back, a left side, a right side, and a top that includes two or more slits; a stretchable insert divided into two or more bags, wherein the stretchable insert has a front, a back, a left side, a right side, and each of the two or more bags has a front, a back, a left side, a right side, and a bottom, wherein the front, back, left side, right side, and bottom of each of the two or more bags includes a multitude of ventilation openings; and at least one receptacle containing a desiccant.

The rigid basket further comprises a corner notch at the junctions of its front with the left side, its front with the right side, its back with the left side, and its back with the right side. The rigid basket also includes at least two compartments on the interior surface of its bottom. Preferably, there are three compartments on the interior surface of the bottom of the rigid basket. These compartments may be molded into the basket or formed by additional parts that are attached to or lay on top of the interior surface of the bottom of the basket.

The stretchable cover further comprises an elastic band around its front, back, left side, and right side. Similarly, the stretchable insert further comprises an elastic band around its front, back, left side, and right side. Preferred elastic bands for the stretchable cover and the stretchable insert are 3 inches in height; however, skilled artisans will appreciate that elastic bands of other dimensions may be used in the invention and achieve the same or a similar result. Preferred stretchable covers have the same number of slits as the stretchable insert has bags.

Skilled artisans will recognize that the stretchable insert and stretchable cover can be made in a variety of ways and achieve the same or similar results. The inventors found that using double welt seams around the slits in the stretchable cover provided good durability, increase lifespan, and allowed for maximum odor control. Further, four slits in the stretchable cover were preferred for the preferred dimensions of the rigid basket. Similarly, four bags were preferred for the stretchable insert.

It will be understood that a variety of elastic bands or other types of bands can be used in the stretchable cover and stretchable insert and achieve the same or analogous results. It is only necessary that each band allows the stretchable cover or stretchable insert to fit tightly over the hamper basket and remain in place until removed by the user.

Preferred baskets are injection molded and include one or more cutouts or holders on the surface of the bottom of the basket so that receptacle(s) containing the desiccant remain in place. In some embodiments fragrance may be mixed with the desiccant.

The invention also provides methods of assembling an improved laundry hamper comprising placing at least one receptacle containing a desiccant inside a compartment in a rigid basket inside a rigid basket, wherein the rigid basket has a front, a back, a left side, a right side, a bottom, and a corner notch at the junctions of its front with the left side, its front with the right side, its back with the left side, and its back with the right side, and at least two compartments on the interior of the bottom; placing a stretchable insert having a front, a back, a left side, a right side, an elastic band around its front, back, left side, and right side and that is divided into at least two bags, wherein each bag has a front, a back, a left side, a right side, and a bottom that includes a multitude of ventilation openings, into the rigid basket such that the elastic band of the stretchable insert fits into the corner notches of the rigid basket and a portion of the stretchable insert extends upward from the corner notches and the remainder of the stretchable insert is inside the rigid basket; and placing a stretchable cover having a front, a back, a left side, a right side, a top, at least two slits in the top, and an elastic band around its front, back, left side, and right side over the stretchable insert such that the elastic band of the stretchable cover fits into the corner notches of the rigid basket and encloses the interior of the rigid basket.

BRIEF DESCRIPTION OF DRAWINGS

The following drawings form part of the present specification and are included to further demonstrate certain aspects of the invention. The invention may be better understood by reference to one or more of these drawings in combination with the detailed description presented herein. Unless specifically noted, articles depicted in the drawings are not necessarily drawn to scale.

DETAILED DESCRIPTION

Figure 1:
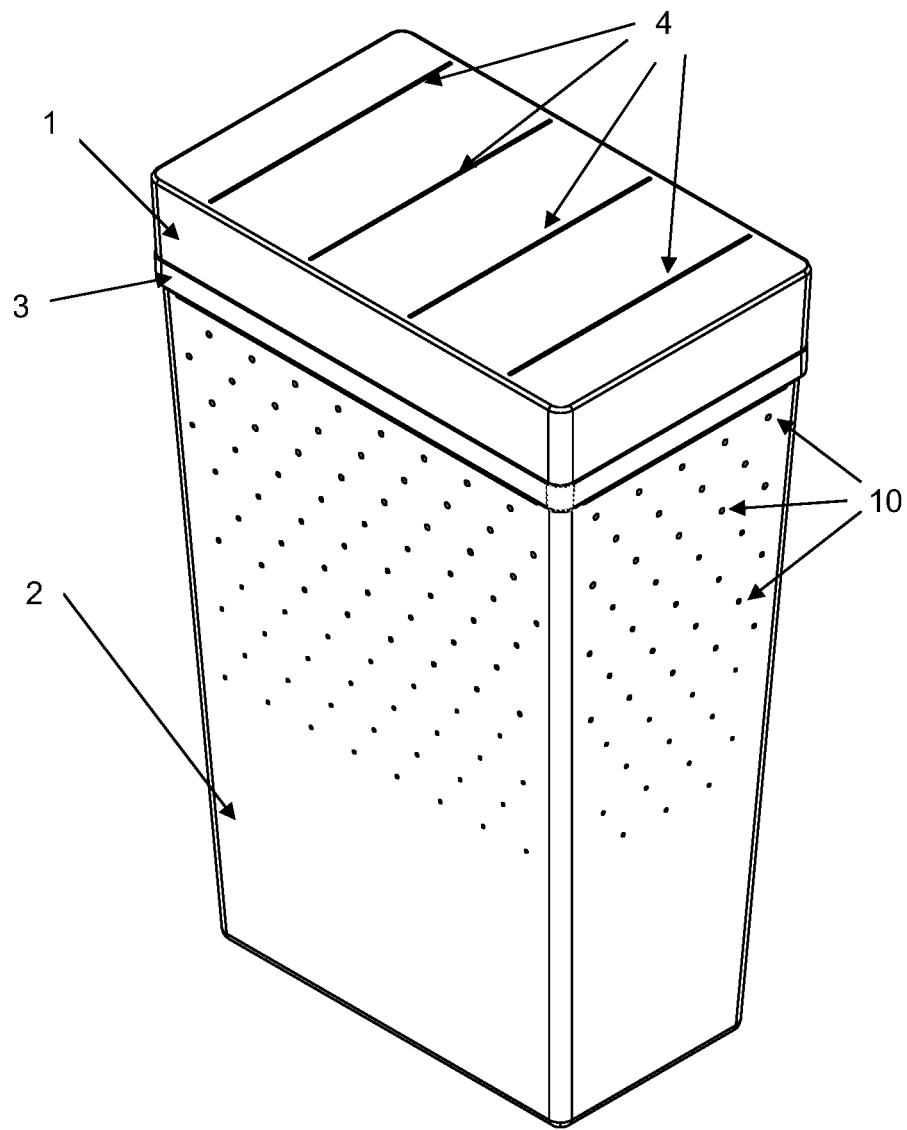
FIG. 1 is a perspective view of the assembled laundry hamper. Openings in the cover are illustrated by four parallel lines across the top surface of the cover. Multiple holes in the front and sides are illustrated by small circles. The bottom of the laundry hamper is plain and unadorned and does not form a part of the design.
Figure 2:
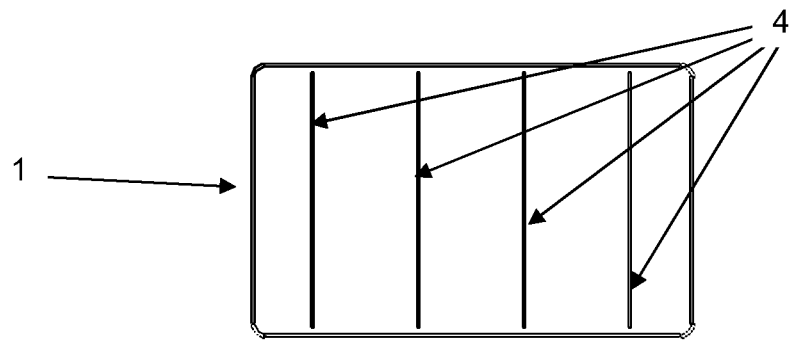
FIG. 2 is a top view thereof.
Figure 3:
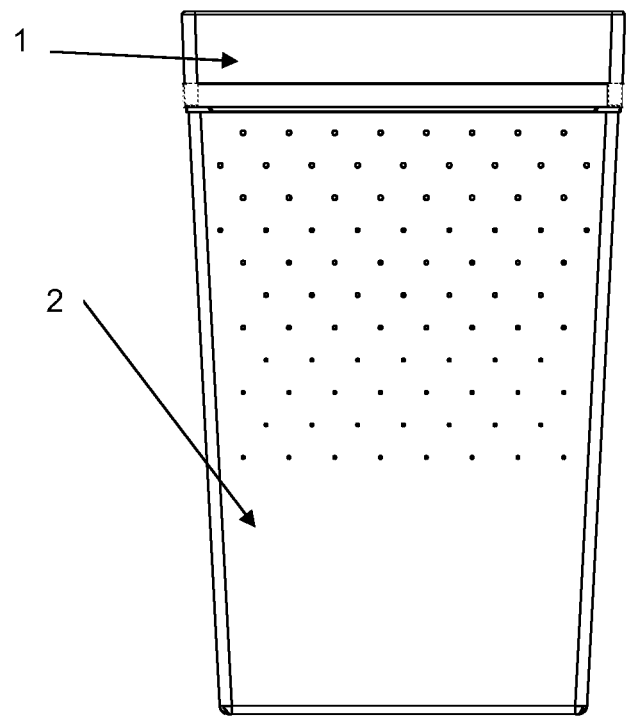
FIG. 3 is a front view thereof, where the back view is identical to the front view.
Figure 4:
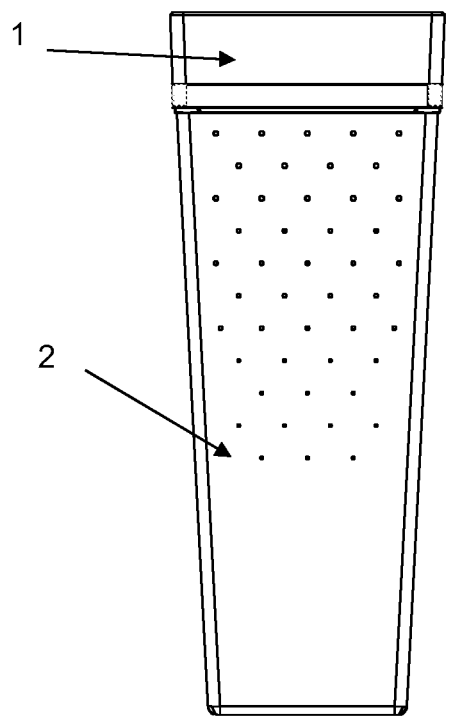
FIG. 4 is a side view thereof, where the right side view is identical to the left side view.
Figure 5:
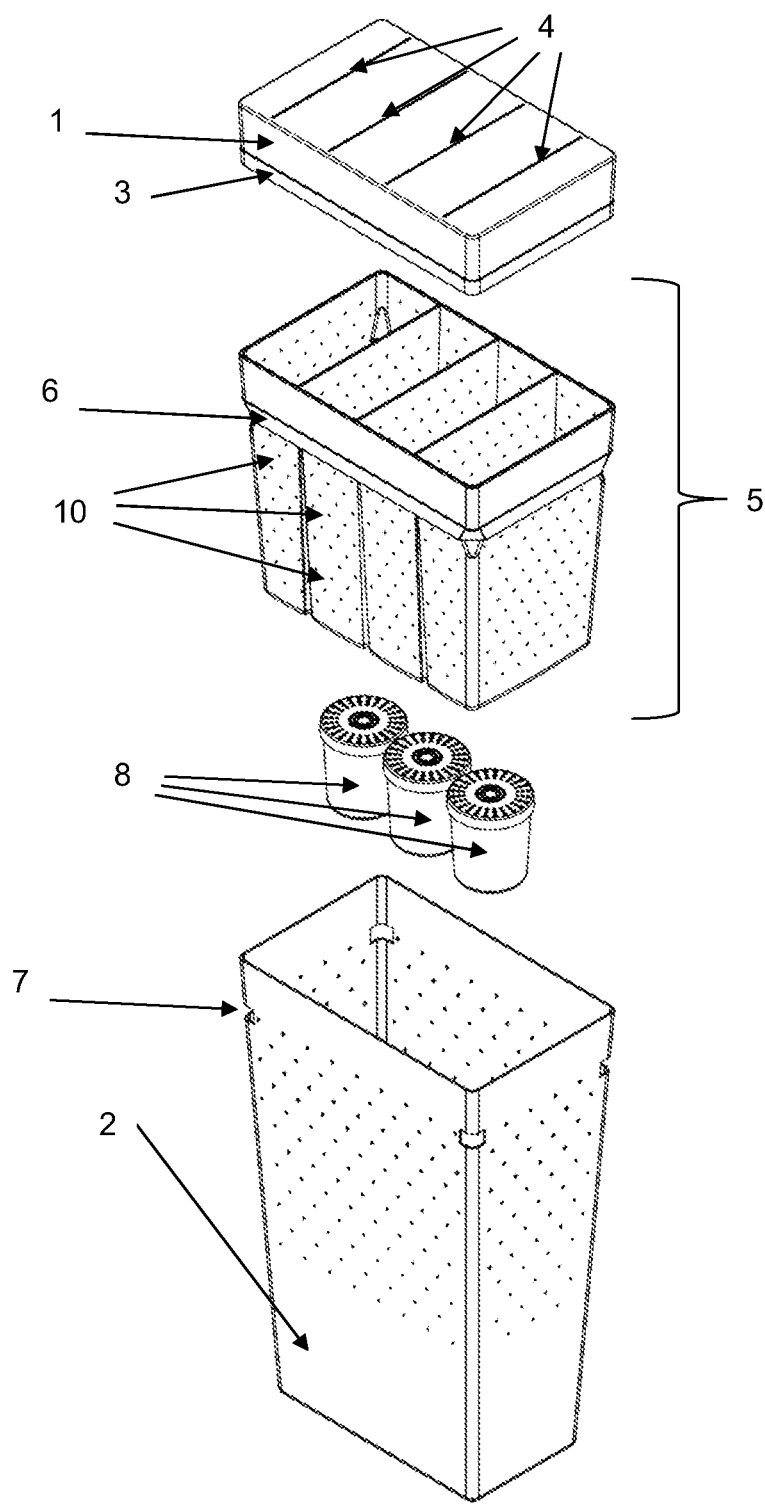
FIG. 5 is an exploded perspective view thereof that shows the spacial relationships of the assembled parts to each other.
Figure 6:
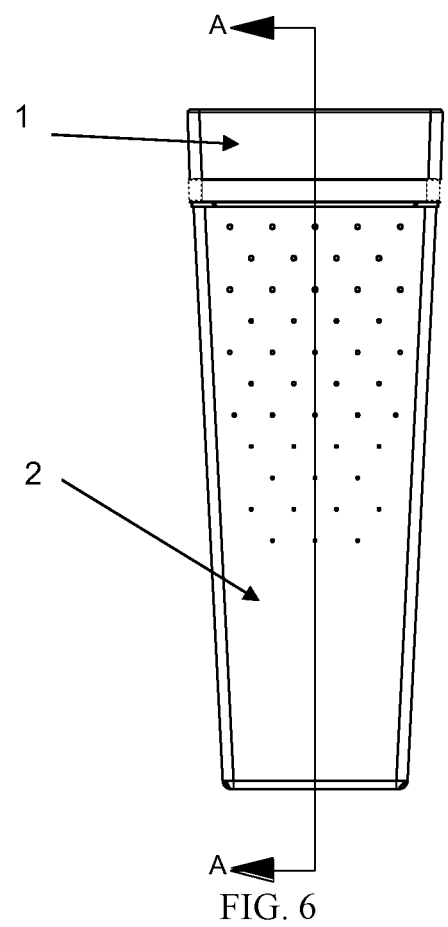
FIG. 6 is a side view of an assembled hamper that indicates cross-section A-A that is shown in FIG. 7.
Figure 7:
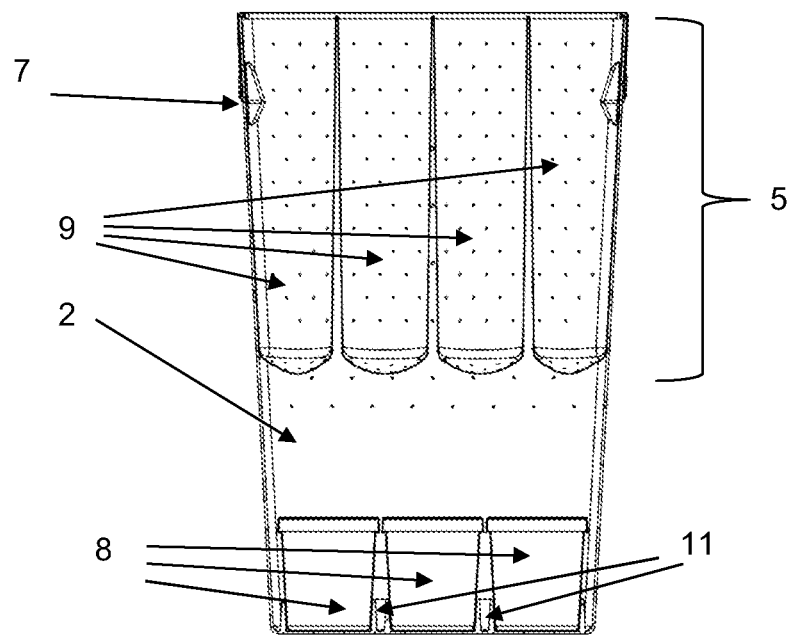
FIG. 7 is the cross-sectional view indicated in FIG. 6.

The invention can be better understood by referring to the accompanying FIGS. 1-7 that depict a preferred embodiment of the invention. Improved laundry hampers of the invention comprise a stretchable cover 1, a stretchable insert 5, a rigid basket 2, and at least one receptacle 8 that contains a desiccant.

The cover 1 includes at least one slit 4 in its top surface. Each slit 4 in the cover 1 is directly above a bag (or pocket) 9 that is part of the stretchable insert 5. The cover 1 also includes an elastic band 3. This elastic band 3 fits inside the corner notches (or notches) 7 that are part of the basket 2 and keeps the cover 1 in place.

Similarly, the stretchable insert 5 has an elastic band 6 that also fits inside the corner notches (or notches) 7 of the basket 2 and holds the stretchable insert 5 in place. The stretchable insert 5 also includes a multitude of ventilation openings (or holes) 10 in each bag 9.

The basket 2 also includes a multitude of ventilation openings (or holes) 10 in its front, back, left, and right sides. In addition, the basket 2 has at least two compartments 11 on the interior of its bottom. These compartments 11 can be molded into the basket 2 or formed separately and attached to the bottom of the basket 2. The sizes and shapes of these compartments can be varied and still achieve the same or similar results.

It will be understood that the dimensions of each of the components of the improved hamper can vary significantly and still result in an improved hamper that can dehumidify the soiled clothing and reduce undesirable odors. Preferred interior dimensions for a rigid basket are 25-33 inches by 14-22 inches by 8-14 inches. More preferably the interior dimensions of the rigid basket are 29 inches by 18 inches by 11 inches. Ideally, the walls of the rigid basket are approximately 1/8 inch in thickness. Preferably the basket is injection molded, and ventilation holes are relatively small and numerous. The notches in the basket can vary in size; however, it is preferable that the sizes of the notches match well with the sizes of the elastic bands that are part of the stretchable cover and stretchable insert.

It is preferred that both the stretchable insert and stretchable cover are made from mildew resistant materials such synthetic fibers. Preferred synthetic fibers are nylons, polyether-polyurea copolymer fabrics such as spandex or elastane, or combinations thereof. A preferred combination of synthetic fibers is 78-80% nylon and 20-22% spandex. Most preferably, the materials used are machine washing safe.

After prototyping multiple different designs, the double welt pocket proved to allow for maximum odor control as well as optimal durability at the seams. Using 3-inch elastic band proved to be the most effective width tested for keeping the stretchable insert in place. Additionally, the four bag (or pocket) design is intended to satisfy the consumers sweaty clothes accumulation while not being too large. Moreover, the strategic cover stitch placement increased lifespan and durability of the insert.

Skilled artisans will appreciate that the sizes of the bags or pockets in the stretchable insert can be varied greatly and still achieve the same or similar results. The inventors found that bags that were approximately 16-inches in length were suitable for use in the invention.

After prototyping multiple different designs for the stretchable insert, the four-pocket design proved to provide the ideal amount of clothing storage while maximizing dehumidification and deodorizing abilities. The meshed nylon/spandex pockets provide an added ventilation element to this component.

The receptacles for the desiccant can be in a variety of shapes and sizes. Receptacles that are about 105 mm tall by 107 mm wide (or about 4 inches by 4 inches) were found to be suitable for use in the invention. Those of skill in the arts will recognize a variety of the suitable desiccants exist and that they may be infused with a pleasing fragrance.

Unless defined otherwise, all technical and scientific terms used herein have the same meaning as is commonly understood by one of skill in the art to which this invention belongs at the time of filing. Terminology used herein is for the purpose of describing particular embodiments of the invention and is not intended to be limiting. The meaning and scope of terms should be clear; however, in the event of any latent ambiguity, definitions provided herein take precedent over any dictionary or extrinsic definition. Further, unless otherwise required by context, singular terms shall include pluralities and plural terms shall include the singular unless the content clearly dictates otherwise. Herein, the use of "or" means "and/or" unless stated otherwise. Furthermore, the use of the term "including", as well as other forms such as "includes" and "included" is not limiting. As used herein, "each" refers to each member of a set or each member of a subset of a set.

What is claimed is:

1. An improved laundry hamper comprising:
   a. a rigid basket having a front, a back, a left side, a right side, an open top, and a bottom, wherein the front, back, left side, and right side include a multitude of ventilation openings, wherein the rigid basket further comprises at least two compartments on an interior surface of the bottom of the rigid basket;
   b. a stretchable cover for placement over the open top of the rigid basket, the stretchable cover having a front, a back, a left side, a right side, and a top that includes two or more slits;
   c. a stretchable insert for placement in an interior of the rigid basket, the stretchable insert divided into two or more bags for receiving laundry, wherein the stretchable insert has a front, a back, a left side, a right side, and each of the two or more bags has a front, a back, a left side, a right side, and a bottom, wherein the front, back, left side, right side, and bottom of each of the two or more bags includes a multitude of ventilation openings; and
   d. at least one receptacle containing a desiccant for placement in at least one of the at least two compartments on the interior surface of the bottom of the rigid basket.

2. The improved laundry hamper of claim 1, wherein the rigid basket further comprises a corner notch at the junctions of its front with the left side, its front with the right side, its back with the left side, and its back with the right side.

3. The improved laundry hamper of claim 1, wherein the rigid basket includes three compartments on the interior surface of the bottom of the rigid basket.

4. The improved laundry hamper of claim 1, wherein the stretchable cover further comprises an elastic band around its front, back, left side, and right side.

5. The improved laundry hamper of claim 1, wherein the stretchable insert further comprises an elastic band around its front, back, left side, and right side.

6. The improved laundry hamper of claim 1, wherein the desiccant is calcium chloride.

7. The improved laundry hamper of claim 1, wherein the stretchable cover has four slits.

8. The improved laundry hamper of claim 1, wherein the stretchable insert has four bags.

9. A method of assembling an improved laundry hamper comprising:
   a. placing at least one receptacle containing a desiccant inside a compartment in a rigid basket, wherein the rigid basket has a front, a back, a left side, a right side, a bottom, a corner notch at the junctions of its front with the left side, its front with the right side, its back with the left side, and its back with the right side, and the compartment including at least two compartments on an interior surface of the bottom of the rigid basket;
   b. placing a stretchable insert having a front, a back, a left side, a right side, an elastic band around its front, back, left side, and right side and that is divided into at least two bags for receiving laundry, wherein each bag has a front, a back, a left side, a right side, and a bottom that includes a multitude of ventilation openings, into the rigid basket such that the elastic band of the stretchable insert fits into the corner notches of the rigid basket and a portion of the stretchable insert extends upward from the corner notches and the remainder of the stretchable insert is inside the rigid basket; and
   c. placing a stretchable cover having a front, a back, a left side, a right side, a top, at least two slits in the top, and an elastic band around its front, back, left side, and right side over the stretchable insert such that the elastic band of the stretchable cover fits into the corner notches of the rigid basket and encloses an interior of the rigid basket.

10. The method of assembling an improved laundry hamper of claim 9, wherein the desiccant is calcium chloride.

11. The method of assembling an improved laundry hamper of claim 9, wherein the front, back, left side, and right side of the rigid basket include a multitude of ventilation openings.

12. The method of assembling an improved laundry hamper of claim 9, wherein the stretchable cover has four slits in its top.

13. The method of assembling an improved laundry hamper of claim 9, wherein the stretchable insert is divided into four bags.

14. The method of assembling an improved laundry hamper of claim 9, wherein the rigid basket has three compartments on the interior surface of the bottom of the rigid basket.

15. The method of assembling an improved laundry hamper of claim 9 further comprising placing the stretchable cover over the stretchable insert so that an interior of each bag in the stretchable insert is accessible through a corresponding slit in the stretchable cover.

* * * * *